United States Patent [19]

Brannan

[11] 4,016,796
[45] Apr. 12, 1977

[54] WEAPON RETENTION DEVICE

[75] Inventor: Jack D. Brannan, Bloomington, Minn.

[73] Assignee: The United States of America as represented by the Secretary of the Navy, Washington, D.C.

[22] Filed: Mar. 29, 1976

[21] Appl. No.: 671,235

[52] U.S. Cl. .................. 89/1.806; 403/2; 403/296
[51] Int. Cl.² .......................... F41F 3/04
[58] Field of Search .......... 89/1.806, 1.807, 1.808, 89/1 R; 102/49.4; 403/2, 296; 285/2, 3, 4

[56] References Cited

UNITED STATES PATENTS

| 2,602,513 | 7/1952 | Conrad et al. | 285/4 X |
| 2,935,767 | 5/1960 | Naegeli | 403/296 X |
| 3,102,594 | 9/1963 | Crowe | 285/3 X |
| 3,415,156 | 12/1968 | Burcham | 89/1.806 |
| 3,444,773 | 5/1969 | Ligne | 89/1.806 X |
| 3,717,068 | 2/1973 | Cochran | 89/1.806 |
| 3,811,784 | 5/1974 | Nilsson | 403/2 |
| 3,922,104 | 11/1975 | McCullough | 403/2 |

Primary Examiner—David H. Brown
Attorney, Agent, or Firm—R. S. Sciascia; Roy Miller; Thomas W. Hennen

[57] ABSTRACT

A break-away retention device for restraining a missile against launching thrust until a predetermined thrust level has been attained is disclosed which employs a preweakened tensile link within a compression barrel. The barrel supplies flexural rigidity and physical protection to the preloaded portion of the tensile link. Tensile preload is adjustable to any predetermined level less than the ultimate strength of the tensile link.

10 Claims, 2 Drawing Figures

WEAPON RETENTION DEVICE

BACKGROUND OF THE INVENTION

1. Field of the Invention

This invention pertains to break-away tensile links which are used to retain one body to another until a predetermined separation force level is reached. More particularly, this invention pertains to such break-away links which possess high resistance to flexural fatigue damage coupled with predictable tensile parting force.

2. Description of the Prior Art.

When certain types of thrust propelled missiles, such as rocket powered missiles, are ignited and launched, some releasable means for retaining the missile to its launching apparatus must be used to prevent the missile from leaving the launching apparatus before the rocket motor reaches its full thrust level. Unless some retaining means is used, the missile may launch at a low thrust level and become unstable, resulting in uncontrollable flight.

Past attempts to solve this problem have utilized a frangible tensile link between the rocket and the launching apparatus. This link restrains the rocket until rocket thrust exceeds the strength of the tensile link, at which time the link parts, releasing the rocket. One problem encountered with such a tensile release link is that if the link has been subjected to bending stresses over a period of time, structural fatique in the link will take place. A fatigue weakened link may part prematurely with resultant adverse effects upon the rocket trajectory.

Other attempts to solve this problem utilize complicated mechanisms which clamp the rocket to the launching apparatus until the moment of release. At the proper time the clamping mechanisms spring away from the rocket, releasing it. These mechanisms are generally heavy, and, because of their added complexity, they increase the expense as well as the chance of launch failure.

SUMMARY OF THE INVENTION

The weapon retention device of this invention overcomes the problems of the prior art by utilizing a frangible tensile member within a compression barrel. The tensile link attaches on one end to the rocket. The other end of the link is retained within the central bore of the compression barrel. The compression barrel is attached to, and remains with, the rocket launching apparatus. A preloading nut or other device attaches to the tensile link and bears against the compression barrel. The portion of the tensile link within the compression barrel has a narrowed section so that local failure will occur there when the tensile force on the link reaches a predetermined level. The preloading nut and compression barrel provide greatly enhanced structural rigidity to the tensile link by increasing the moment of inertia in the region of the frangible narrowed section.

BRIEF DESCRIPTION OF THE DRAWING

Further advantages of the present invention will emerge from a description which follows of a weapon retention device according to the invention, given with reference to the accompanying drawings, in which.

DESCRIPTION OF THE PREFERRED EMBODIMENT

Figure 1:
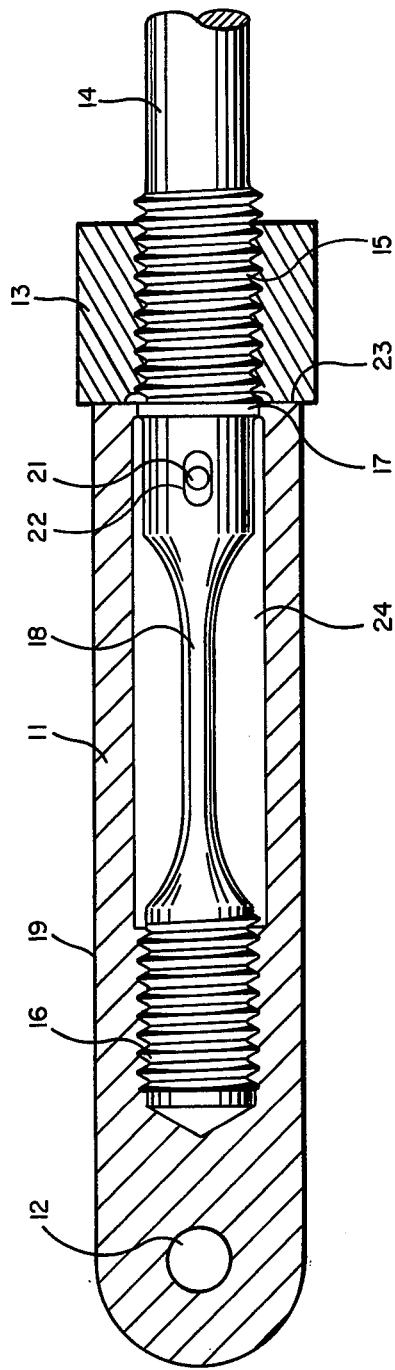
FIG. 1 shows a longitudinal sectional view of a weapon retention device.

Referring now to the drawings, wherein like reference numerals correspond to like parts and elements throughout the several Figures, there is shown in FIG. 1 compression barrel 19 having a central bore 24, pin engagement hole 12 for attachment to rocket launching apparatus, not shown, and compression barrel sidewall 11. Tensile link 14 is shown attached to compression barrel 19 by tensile link attaching threads 16. Tensile preload nut 13 is shown engaging tensile preloading threads 15, and bearing against compression sidewall 11 at contact surface 23. Coaxial alignment of tensile link 14 with respect to compression barrel 19 is achieved by shoulder 17 which closely fits the inside diameter of central bore 24. Tensile break-away section 18 is positioned between tensile link attaching threads 16 and tensile preloading threads 15, and is the section of tensile link 14 which parts under excessive tensile stress. Finally, anti-torque pin 21 is shown inserted through compression barrel sidewall 11 and elongated hole 22 in tensile link 14.

The purpose of anti-torque pin 21 is to restrain tensile link 14 against rotation as tensile preload nut 13 is tightened upon tensile preload threads 15. Elongated hole 22 closely fits two sides of antitorque pin 21 while allowing for longitudinal movement of tensile link 14 as tensile break-away section 18 stretches under tensile preload. Anti-torque pin 21 and elongated hole 22 represent one means of preventing rotation of tensile link 14 while tensile preload nut 13 is adjusted, although any other means of preventing tensile link 14 rotation could be used. Similarly, tensile link attaching threads 16 and tensile preloading threads 15 could be replaced by any other suitable attaching means.

Tensile link 14 is threaded into or otherwise attached to compression barrel 19 until it is fully seated therein. Anti-torque pin 21 is then inserted through elongated hole 22 and at least one aligned hole in compression barrel sidewall 11. Next, preloading unit 13 is threaded onto tensile preloading threads 15 until it contacts compression barrel 19 at contact surface 23. The device is then mounted by pin engagement hole 12, and by rocket attachment means on the end of tensile link 14, not shown in FIG. 1, in a tensile preloading machine, not shown. The preloading machine applies a predetermined tensile force to tensile link 14. While the device is so stressed, preloading nut 13 is tightened against contact surface 23 to maintain the preload. The device is then removed from the preloading machine. Thread seizing compounds may be employed to insure that preloading nut 13 or tensile link attaching threads 16 do not loosen through vibration or handling. Anti-torque pin 21 may now be removed.

The device is now ready to be attached by pin engagement hole 12 and by rocket attachment means, between a rocket and a launching apparatus. After rocket motor ignition, as the thrust level builds to full force, the retention device holds the rocket to the launcher. When rocket thrust exceeds tensile preload, tensile link 14 is loaded until its ultimate strength is exceeded, and its parts. A portion of tensile link 14 and preloading nut 13 are launched and go with the rocket, while the remainder of tensile link 14 and compression barrel 19 stay with the launching apparatus.

Figure 2:
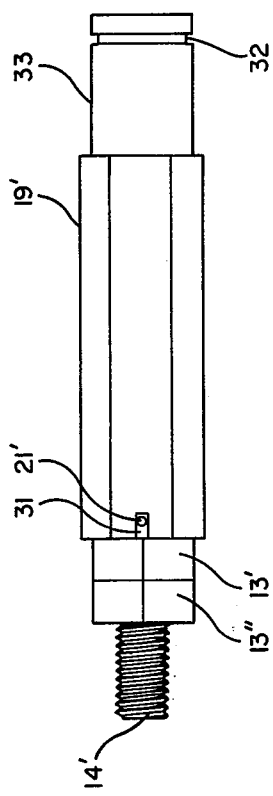
FIG. 2 shows a side view of a weapon retention device.

FIG. 2 illustrates a different design for a weapon retention device utilizing this invention. Compression barrel 19' is shown constructed from hexagonal stock, having machined surface 33 for insertion into a round hole in rocket launcher apparatus, not shown. Machined groove 32 is for installation of a snap ring or other retention means after compression barrel 19' has been inserted into the launcher apparatus. Compression barrel 19' has a central threaded bore, not shown, into which tensile link 14' is threaded. Slot 31 is cut into one end of compression barrel 19' on both sides. Slot 31 receives the ends of anti-torque spring pin 21'. When tensile link 14' parts, pin 21', which penetrates link 14', slips out of slot 31 and goes with the portion of link 14' attached to the rocket.

The retention device of FIG. 2 is assembled and preloaded in the same manner as described for the device shown in FIG. 1. However, in FIG. 2, a preloading nut 13' and a locking nut 13" are used in place of the single preload nut 13 shown in FIG. 1. Also, the device of FIG. 2 may be attached to the rocket by means of the exposed threads on tensile link 14' shown extending beyond compression barrel 19' and nuts 13' and 13". The internal threads in the central bore of compression barrel 19' may also be used for attachment of the device to a threaded stud on launching apparatus if tensile link 14' is sized to not extend the full length of compression barrel 19'. Of course, tensile link 14' may also incorporate the features shown in FIG. 1 as break-away section 18 and shoulder 17.

In each described embodiment, compression barrel 19 or 19' supplies physical protection to the prestressed and weakened portion of tensile link 14 or 14' by surrounding it. Also, structural rigidity is greatly enhanced over that of the tensile link alone because the sectional area of the assembled device, at a section where the tensile link is narrowed, includes the surrounding compression barrel wall thickness which is at a distance from the centroid of that sectional area. These parameters mean that the comparable moment of inertia at this section is much greater for the assembled device than for the tensile link alone.

As is well known, resistance of a beam to bending is directly proportional to the moment of inertia of a section of that beam subjected to a bending moment. By increasing the moment of inertia, the device of this invention has greater resistance to bending than would the tensile link alone, while both the link and assembly have approximately the same tensile failure value. The assembly has less susceptibility to fatigue damage, however, because of its greater stiffness, and therefore is a more reliable weapon retention device.

Obviously many modifications and variations of the present invention are possible in light of the above teachings. It is therefore to be understood that within the scope of the appended claims the invention may be practiced otherwise than as specifically described.

What is claimed is:

1. A retention device for releaseably retaining a missile to a launching apparatus, said retention device comprising:

a cylindrical member having first and second ends, a central bore, and a slot which communicates with said second end;

an elongated tensile link having first and second ends, a region of reduced tensile strength, means for attachment of said first end of said link within said central bore, and a transverse hole located between said region of reduced tensile strength and said second end;

a link preloading element having means for attachment to said elongated tensile link, and a bearing surface for engagement against said second end of said cylindrical member;

said first end of said elongated tensile link being retained within said cylindrical member central bore, and said link preloading element being attached to said elongated tensile link at a point between said hole and said second end of said link; and an anti-torque pin penetrating said elongated tensile link through said hole, and said pin also penetrating said cylindrical member through said slot in said second end of said cylindrical member for preventing relative rotation between said tensile link and said cylindrical member.

2. The retention device of claim 1 wherein said link preloading element bears compressively against said second end of said cylindrical member.

3. The retention device of claim 1 wherein said link preloading element may be adjusted to change the amount of tensile preload present in said elongated tensile link.

4. The retention device of claim 1 wherein means are provided for maintaining coaxial alignment of said elongated tensile link with said cylindrical member.

5. The retention device of claim 1 wherein said cylindrical member has a circumferential groove at said first end for attachment to a launching apparatus, and said elongated tensile link has threads on said second end for attachment to a missile.

6. The retention device of claim 1 wherein said means for attachment of said link preloading element to said elongated tensile link comprises a threaded connection.

7. The retention device of claim 6 wherein said link preloading element comprises at least one threaded nut.

8. The retention device of claim 1 wherein said means for attachment of said first end of said link within said cylindrical member central bore comprises a threaded connection.

9. The retention device of claim 8 wherein said elongated tensile link has means for locking said first end of said link in threaded engagement with said cylindrical member central bore.

10. The retention device of claim 8 wherein said tensile link has a shoulder for maintaining coaxial alignment of said link with said central bore.

* * * * *